United States Patent [19]

Laughner et al.

[11] Patent Number: 4,595,743

[45] Date of Patent: Jun. 17, 1986

[54] HIGH MODULUS POLYUREA ELASTOMERS PREPARED WITH AMINE-INITIATED POLYOLS

[75] Inventors: Michael K. Laughner; James R. Porter; Lee M. Huber, all of Lake Jackson, Tex.

[73] Assignee: The Dow Chemical Company, Midland, Mich.

[21] Appl. No.: 693,718

[22] Filed: Jan. 22, 1985

[51] Int. Cl.$^3$ ............................................. C08G 18/32
[52] U.S. Cl. ..................................... 528/73; 252/182; 528/77; 528/78
[58] Field of Search ............................ 528/73, 77, 78; 252/182

[56] References Cited

U.S. PATENT DOCUMENTS 4,298,701 11/1981 Meyborg et al. ...................... 528/77
4,442,235 4/1984 Taylor et al. ......................... 528/77

Primary Examiner—Maurice J. Welsh
Attorney, Agent, or Firm—Gary C. Cohn

[57] ABSTRACT

A polyurea or polyurea-polyurethane elastomer which is the reaction product of reaction mixture comprising (a) an organic polyisocyanate, (b) a low equivalent weight aromatic amine chain extender in an amount from about 15 to 60 parts by weight based on the weight of isocyanate reactive components present in said reaction mixture, (c) an amount of an amine-initiated polyol sufficient to provide the elastomer with a measurably decreased brittleness at demold as compared to a similar elastomer prepared in the absence of said amine initiated polyol.

21 Claims, No Drawings

HIGH MODULUS POLYUREA ELASTOMERS PREPARED WITH AMINE-INITIATED POLYOLS

BACKGROUND OF THE INVENTION

This invention relates to polyurea or polyurea-polyurethane elastomers, more particularly to polyurea or polyurea-polyurethane elastomers which are prepared in part from low equivalent weight polyamines.

Polyurea and polyurea-polyurethane elastomers are commonly prepared using a low equivalent weight polyamine as a "chain extender" to increase the flexural modulus (stiffness) thereof. Flexural modulus generally increases with an increasing amount of the chain extender so that when a high modulus elastomer is desired, it is general practice to increase the amount of amine chain extender used in its preparation.

However, the use of large amounts of these amine chain extenders causes the elastomer to exhibit poor "green strength", i.e. the elastomer is quite brittle when removed from its mold. The lack of green strength renders the elastomer difficult or impossible to handle without distorting or cracking. For this reason, these amine chain extenders are largely restricted to use in preparing elastomers of low to moderate flexural modulus.

It has been attempted to overcome this problem of poor green strength by employing a high mold temperature. This has resulted in some improvement in green strength, but has the substantial disadvantage of causing polymer degradation, providing a polymer having poor surface qualities and of being relatively hazardous due to the need to handle a very hot mold.

Similarly, attempts to solve the green strength problem by employing an organometallic catalyst have been made. Unfortunately, the catalysts have been found to be unstable in amine-containing formulations, and tend to cause polymer degradation at high cure temperatures.

Although other low equivalent weight compounds such as polyols can be used to replace all or part of the amine chain extender, its use provides benefits such as excellent thermal properties (good heat sag and high heat distortion temperature). The replacement of the amine chain extender tends to adversely affect these properties. For this reason it is desirable to employ a high proportion thereof in preparing elastomers.

It would be desirable to provide a polyurea or polyurea-polyurethane elastomer derived from a relatively high proportion of an amine chain extender which also exhibits sufficient green strength to permit easy handling of the elastomer at demold.

SUMMARY OF THE INVENTION

This invention is in one aspect a polyurea or polyurea-polyurethane elastomer which is the reaction product of a reaction mixture comprising (a) an organic polyisocyanate, (b) an aromatic amine chain extender in an amount from about 15 to 60 parts by weight based on the weight of isocyanate-reactive components present in the reaction mixture, and (c) an amount of an amine-initiated polyol sufficient to provide the elastomer with a measurably decreased brittleness at demold as compared to a similar elastomer prepared in the absence of said amine-initiated polyol.

In another aspect, the present invention is an active hydrogen containing composition comprising (a) an aromatic amine chain extender in an amount from about 20 to 50 percent by weight based on the weight of isocyanate-reactive components in the composition, and (b) an amount of an amine-initiated polyol sufficient to provide an elastomer prepared from the active hydrogen containing composition with measurably decreased brittleness at demold compared to a similar elastomer prepared in the absence of said amine initiated polyol.

It has surprisingly been discovered that the incorporation of an amine initiated polyol into a polyurea or polyurea-polyurethane elastomer formulation which also contains an amine chain extender provides the resulting elastomer with substantially improved green strength. Thus, the practice of this invention permits the use of higher levels of the amine chain extender in an elastomer formulation, thereby permitting the formation of higher flexural modulus elastomers. This invention is particularly useful in the preparation of high flexural modulus elastomers in a reaction injection molding process.

DETAILED DESCRIPTION OF THE INVENTION

The amine-initiated polyol employed herein comprises a polyhydroxyl containing compound containing one or more tertiary amine groups. Most typically, the amine-initiated polyol is formed by adding an alkylene oxide to a primary or secondary amine-containing compound, in which case the amine-initiated polyol contains a number of tertiary amine groups equal to the number of nitrogen atoms in the initiator. Preferably, the amine-initiated polyol is a reaction product of a polyamine with propylene oxide, ethylene oxide, butylene oxide or mixtures thereof.

The amine-containing compound (sometimes referred to herein as the "initiator") useful in this invention contains at least two amine hydrogen atoms. For the purposes of this invention, any compound containing a hydrogen atom attached to a nitrogen atom is considered to be an amine. Suitable amine-containing compound useful herein as the initiator include, for example, ammonia, aliphatic amines, aromatic amines, heterocyclic nitrogen containing compounds such as piperazine, substituted piperazines, hydrogenated triazine, hydrogenated ozadiazines, amine-terminated polyethers and the like. Specific compounds which are among those useful as the initiator include, for example, ammonia, methylamine, ethanolamine, aminoethylethanolamine, ethylenediamine, diethylene triamine, toluene diamine, phenylene diamine, diaminocyclohexane, aniline, piperazine, aminoethylpiperazine, aminoethylpiperadine amine-terminated poly(alkylene oxides) and the like. Of these, especially preferred are ammonia, ethylene diamine, methylamine, aminoethyl piperazine, and piperazine.

To the initiator is added at least one, preferably about 1 to 100, more preferably from about 1 to 30 moles of an alkylene oxide per amine hydrogen present in the initiator. The alkylene oxide is preferably ethylene oxide, propylene oxide, butylene oxide or a mixture thereof. The resulting hydroxyl-terminated compound advantageously has a molecular weight of from about 100 to 12,000, preferably about 100 to 8,000. Particularly suitable amine initiated polyols include, for example, triethanolamine, methyldiethanol amine, triisopropanolamine, methyldiisopropanolamine, ethyldiethanol amine, adducts of ethylene diamine and sufficient of ethylene oxide and/or propylene oxide to provide a molecular weight of about 100–1000, N,N-diisopropyl aniline, adducts of diethylene triamine with ethylene oxide and/or propylene oxide to a molecular weight of about 200–1000, and adducts of piperazine or aminoethyl piperazine with propylene oxide and/or ethylene oxide to a molecular weight of up to 12,000. Especially preferred are polyols formed by adding propylene oxide to aminoethyl piperazine to a molecular weight of about 150–8000.

Methods for conducting alkylene oxide polymerization reactions in the presence of an initiator are well known and described, for example, in U.S. Pat. No. 3,393,243.

The aromatic amine chain extender useful herein contains at least 2, preferably 2 to 6, more preferably about 2 to 3 primary or secondary amine groups which are bonded to an aromatic ring. The aromatic amine chain extender also has an equivalent weight of less than about 450 and preferably from about 54 to 200. Preferred are those aromatic polyamines which are substituted in the positions ortho to the amine groups. Suitable such aromatic polyamines include for example, 1,4-diamino benzene, 2,4-diamino toluene, 2,4'- and/or 4,4'-diaminodiphenylmethane, 3,3'-dimethyl-4,4'-diaminodiphenyl methane, 4,4'-diamino-2,2'-diphenyl propane, 2,4-diamino mesitylene, 1,3,5-triethyl-2,4-diamino benzene, 1,3,5-triisopropyl-2,4-diamino benzene, 1-methyl-3,5-diethyl-2,4-diamino benzene, 1-methyl-3,5-diethyl-2,6-diamino benzene, 4,6-dimethyl-2-ethyl-1,3-diamino benzene, 3,5,3',5'-tetraethyl-4,4'-diaminodiphenyl methane, 3,5,3',5'-tetraisopropyl-4,4'-diaminodiphenylmethane, 3,5-diethyl-3',5'-diisopropyl-4,4'-diaminodiphenyl methane, and the like. Particularly preferred are 1-methyl-3,5-diethyl-2,4-diamino benzene or mixtures thereof with 1-methyl-3,5-diethyl-2,6-diamino benzene. Mixtures of these chain extenders with low equivalent weight glycols or aliphatic amines are also useful herein.

Of the total weight of isocyanate reactive materials employed (i.e. the aromatic amine chain extender and amine initiated polyol as well as other active hydrogen containing materials which may be present in the formulation), the aromatic amine chain extender comprises from about 15 to 60, preferably 25 to 50, more preferably 30 to 45 and most preferably 35 to 45 percent by weight. It is when the aromatic amine chain extender is present in these amounts that the benefits of using the amine-initiated polyol are most apparent. Especially preferred are the higher modulus elastomers obtained with the use of relatively high levels of amine chain extender such as set out in the more and most preferred ranges.

The amine-initiated polyol is employed in an amount sufficient to provide the elastomer with a measurably decreased brittleness at demold as compared to a similar elastomer prepared in the absence of said amine-initiated polyol. The particular amount of amine initiated polyol needed to obtain such a result depends somewhat on the molecular weight thereof and the number of nitrogen atoms contained therein as well as the quantity of aromatic amine chain extender present. In general, the lower the molecular weight of the amine-initiated polyol and the more nitrogen atoms contained therein the less of the amine-initiated polyol is required to obtain the desired result.

When the amine chain extender is present in a relatively small amount, e.g. 35% or less by weight of all isocyanate-reactive components, from about 3–30, preferably about 5–25 percent by weight (based on all isocyanate-reactive components) of a relatively low molecular weight (i.e. less than 1000 molecular weight) amine initiated polyol is generally sufficient to provide the desired improvement in green strength. When a higher molecular weight amine initiated polyol is employed, from about 15–65, preferably about 20–55 weight percent thereof is generally satisfactory. Of course, mixtures of lesser amounts of low and high molecular weight amine initiated polyols can be used.

When higher amounts of the amine chain extender are used (35 weight percent or higher) from about 5–40, preferably about 10–30 weight percent of a low molecular weight amine initiated polyol generally provides the desired improvement in green strength. A high molecular weight amine initiated polyol is generally required in an amount from about 25–65, preferably about 35–55 weight percent. It is noted that at particularly high levels of amine chain extender, (i.e. about 40 weight percent or more) the high molecular weight amine initiated polyol may not be sufficient by itself to provide the desired green strength improvement. In such cases, a low molecular weight amine-initiated polyol may be used for that purpose. However, when a large quantity of a low equivalent weight amine initiated polyol is used with a formulation containing a high percentage of amine chain extender, the resulting polymer often exhibits very poor impact strength. Thus, it is highly preferred to employ a mixture of about 35–55 weight percent of a high molecular weight amine initiated polyol and about 1–10 weight percent of a low equivalent weight amine initiated polyol when particularly high levels of the amine chain extender are used.

It will be noted that the amine-initiated polyol will react with polyisocyanates used herein to form part of the resulting elastomer. Accordingly, the functionality and molecular weight of the amine initiated polyol will have substantial effect on the properties of the resulting elastomer. For this reason, the functionality and molecular weight of the amine-initiated polyol are advantageously chosen to provide the resulting elastomer with desirable physical properites i.e. desirable tensile strength, elongation, impact strength, heat distortion temperature and the like. In the case of elastomeric materials, it is generally preferred to employ amine initiated polyols having a functionality of about 2 to 4, more preferably about 2 to 3, in order to minimize undesirable crosslinking.

Organic polyisocyanates which may be employed include aromatic, aliphatic and cycloaliphatic polyisocyanates and combinations thereof. Representative of these types are diisocyanates such as p- or m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-diphenyl diisocyanate, hexamethylene diisocyanate, isophorone diisocyanate and hydrogenated derivatives of the foregoing aromatic polyisocyanate; triisocyanates such as polymethylene polyphenylisocyanate, tolylene-2,4,6-triisocyanate and hydrogenated derivatives thereof; and tetraisocyanates such as 4,4'-dimethyldiphenylmethane-2,2',5,5'-tetraisocyanate and the like.

A crude polyisocyanate may also be used in the practice of the present invention, such as the crude toluene diisocyanate obtained by the phosgenation of a mixture of toluene diamines or the crude diphenylmethylene diisocyanate obtained by the phosgenation of crude diphenylmethylenediamine. The preferred undistilled or crude isocyanates are disclosed in U.S. Pat. No. 3,215,652.

Also useful as the polyisocyanate herein are isocyanate-terminated prepolymers or quasi-prepolymers prepared by reacting a stoichiometric excess of a polyisocyanate as described herein with an active hydrogen containing compound.

A relatively high equivalent weight polyahl is optionally used to prepare the polyurea or polyurea-polyurethane elastomer of this invention. A "polyahl" is defined herein as a compound or mixture of compounds having a plurality hydrogen atoms which are active according to the Zerewitnoff test described by Kohler in the Journal of the American Chemical Society, Vol. 49, page 3181 (1927). Examples of polyahls include polyols, polyamines, polymercaptans, polyacids and the like, with polyols and polyamines being preferred. Suitable polyols include polyether polyols, polyester polyols, polyhydroxyl containing phosphorous compound, hydroxyl-terminated acetal resins, hydroxyl-terminated amines and polyamines and the so called polymer or copolymer polyols which comprise a dispersion of polymer or copolymer in a continuous polyol phase. Examples of these and other suitable polyols are described more fully in U.S. Pat. No. 4,394,491, particularly in columns 3-5 thereof. Suitable copolymer polyols include those described in U.S. Pat. Nos. RE 29118, RE 28715 and 4,394,491. Suitable polyamines include the corresponding amine-terminated polyether and polyester polyols.

Of particular interest herein are the polyether polyols, polyester polyols and corresponding amine-terminated polyether and polyester polyols having a functionality of about 2 to 6 (i.e. has 2-6 reactive hydrogen atoms) and a molecular weight of from about 200 to 8000, especially about 400 to 6000. Suitable amine terminated polyethers include those described in U.S. Pat. No. 3,666,788 to Rowton and those commercially available from Texaco Chemical Company under the tradenames Jeffamine D-400, Jeffamine D-2000, Jeffamine T-5000.

A particular advantage of the active hydrogen-containing composition of the present invention is that it is autocatalytic, and no catalyst is required to prepare molded articles therefrom. This property is significant in that the use of conventional catalysts, particularly organometallic catalysts, are known to catalyze the depolymerization of polyureas at high temperatures, such as are encountered in molding curing or painting same. In addition, such catalysts are known to be unstable in formulations containing a high concentration of amines. Thus, the present invention provides a solution to the problems associated with the use of conventional organometallic catalysts in preparing polyureas.

In addition to the foregoing components other optional ingredients such as pigments, fillers, antioxidants, blowing agents, surfactants, preservatives, flame retardants and the like may be employed herein for their art-recognized purpose. Of particular interest herein is the use of an internal mold release agent such as is described in copending application Ser. Nos. 570,141 and 641,883, and U.S. Pat. No. 4,396,729.

In preparing elastomers according to this invention all components except the polyisocyanates are advantageously blended and the resulting mixture reacted with the polyisocyanate in a mold to obtain the product elastomer. Due to the presence of the aromatic amine chain extender in the formulation it is generally preferred to employ mechanical mixing equipment to mix the active hydrogen-containing components with the polyisocyanate and transfer the reacting mixture to a mold. Most preferably, reaction injection molding equipment is employed to mix the respective components to prepare the elastomer of this invention. Suitable reaction injection molding techniques are described for example in a paper entitled "The Bay Flex 110 Series—The New Generation of RIM Materials" by W. A. Ludwico and R. P. Taylor presented at the Society of Automotive Engineers Passenger Car meeting, Detroit Mich., Sept. 26-30, 1977 and British Pat. No. 1,534,258.

The elastomer of this invention often exhibits a high modulus, good heat distortion properties, good low temperature impact strength, and good "green strength". Said elastomer is useful for preparing a variety of rigid molded articles, particularly rigid body parts for automobiles. At lower levels of the amine chain extender, softer, more elastomeric parts can also be prepared.

The following examples are provided to illustrate the invention and are not intended to limit the scope thereof. All parts and percentages are by weight unless otherwise indicated.

EXAMPLE 1

This example illustrates the use of low molecular weight amine-initiated polyols to improve the green strength of diethyltoluene diamine extended polymers.

The formulations used to prepare Sample Nos. 1-6 and Comparative Sample A are as indicated in Table I. Comparative Sample No. A contains no amine initiated polyol. Sample Nos. 1-6 contain diverse low molecular weight amine initiated polyols.

Moldings are prepared from each of Sample Nos. 1-6 and Comparative Sample A by mixing with a 236 equivalent weight soft segment diphenylmethane diisocyanate MDI prepolymer at a 103 index on an Admiral reaction injection molding machine. The "A-side" temperature is 90° F. in Sample Nos. 1 and 2 and 100° F. in Sample Nos. 3 and the Comparative Sample. The "B-side" temperature is 95° F. in Sample No. 1, 90° F. in Sample No. 2 and 100° F. in Sample Nos. 3 and the Comparative Sample. The reactants are injected into a ⅛" deep mold which is preheated and maintained at 160°-180° F. After 30 seconds on the mold, the parts are demolded. After cooling to room temperature, the green strength of each molding is tested. The moldings are then post-cured at 325° F. for 30 minutes, after which the physical properties of the moldings are tested. The results of this testing are as reported in Table I.

TABLE I

| | Parts By Weight | | | | | | |
| | Sample Numbers | | | | | | Comp. Sample |
| Ingredient | 1 | 2 | 3 | 4 | 5 | 6 | A |
|---|---|---|---|---|---|---|---|
| Polyol A[1] | 35 | 35 | 35 | 35 | 35 | 0 | 35 |
| Polyol B[2] | 0 | 0 | 0 | 0 | 0 | 44.6 | 0 |
| Polyol C | 0 | 0 | 0 | 0 | 10 | 10 | 0 |
| Amine-Terminated Polyol[3] | 10 | 10 | 10 | 10 | 0 | 10 | 10 |
| DETDA[4] | 35 | 35 | 35 | 35 | 35 | 35 | 35 |
| Zinc Laurate[5] | 3.7 | 0 | 0 | 4 | 4 | 4 | 3.7 |
| AIP-A[6] | 0 | 0 | 0 | 0 | 9.3 | 17.2 | 0 |
| AIP-B[7] | 6.3 | 0 | 0 | 0 | 0 | 0 | 0 |
| AIP-C[8] | 0 | 10 | 0 | 0 | 0 | 0 | 0 |
| AIP-D[9] | 0 | 0 | 20 | 0 | 0 | 0 | 0 |
| AIP-E[10] | 0 | 0 | 0 | 12.6 | 0 | 0 | 0 |
| Test | | | | | | | |
| Green Strength[11] | Good | Fair | Excell. | Good | Excell. | Excell. | Poor |
| Flexural Modulus[12] psi | 89,000 | 95,000 | 123,000 | 99,000 | 95,000 | 115,500 | 94,000 |
| Tensile Strength[12] psi | 4,700 | 4,800 | 5,400 | 5,300 | 4,600 | 4,550 | 4,400 |
| Elongation[12] % | 193 | 179 | 82 | 152 | 110 | 33 | 194 |
| Die "C" tear[13] pli | 845 | 908 | 530 | 907 | 760 | 587 | 799 |
| 325° C. heat sag[14] | 2.3 | 1.28 | 1.30 | 2.40 | 0.75 | 1.40 | 1.17 |
| 275° C. heat sag[14] | | | | | | | |
| −30° C. Gardner Impact Strength[15] in-lb | 140 | 148 | 84 | N.D. | 64 | 64 | 40 |
| Specific Gravity | 1.11 | 1.07 | 1.14 | 1.06 | 1.07 | 1.07 | 1.08 |

Footnotes for Table I
[1] 5000 MW ethylene-oxide capped glycerine-initiated poly(propylene oxide) triol
[2] 6000 MW ethylene-oxide capped glycerine-initiated poly(propylene oxide) triol
[3] Jeffamine D-2000, sold by Texaco Chemical Company
[4] Diethyltoluenediamine
[5] Added as an internal mold release agent.
[6] AIP — amine-initiated polyol. AIP-A is an adduct of diethylenediamine and 5 moles of propylene oxide.
[7] AIP—B = methyldiethanolamine
[8] AIP—C = an adduct of piperazine and 2 moles of propylene oxide.
[9] AIP—D = an adduct of aminoethyl piperazine and 3 moles of propylene oxide.
[10] AIP—E = an adduct of aminoethyl piperazine and 6 moles of propylene oxide.
[11] Evaluated by bending over a corner of the demolded polymer. Excellent = no visual deformities on repeated bends. Good = slight crazing or cracking on repeated bends. Fair = slight crazing on first bend. Poor = substantial cracking on first bend. V. Poor = molding cracks upon removal from mold.
[12] ASTM D-790
[13] ASTM D-624-70
[14] Conducted for 30 minutes with 6" overhang
[15] ASTM D-256

Comparison of Sample No. 1 and Comparative Sample A shows that essentially equivalent physical properties are obtained with the present invention, except that very substantial improvements in green strength and low temperature impact strength are seen. Examples 2 and 3 employ different amine-initiated polyols, and are further significant in that no zinc laurate is present. Zinc laurate is a known catalyst for polyol-isocyanate reactions, and would be expected to contribute to good green strength. However, Sample Nos. 2 and 3 exhibit substantially improved green strength compared to Comparative Sample A, which contains zinc laurate. In all cases, significant improvements in green strength and low temperature impact properties are seen.

EXAMPLE 2

This example illustrates the use of high molecular weight amine initiated polyols to improve the green strength of diethyltoluene diamine extended polymers.

The formulations used to prepare Sample Nos. 7–11 and Comparative Sample No. B are as indicated in Table II. The Comparative Sample contains no amine initiated polyol. Sample Nos. 7–11 contain diverse high molecular weight amine initiated polyols. The moldings are prepared according to the general procedure described in Example 1.

TABLE II

| | Parts By Weight | | | | | |
| | Sample Number | | | | | Comp. Sample |
| Ingredient | 7 | 8 | 9 | 10 | 11 | B |
|---|---|---|---|---|---|---|
| Polyol A[1] | 0 | 0 | 0 | 0 | 0 | 49.2 |
| Amine-Terminated Polyol[2] | 10 | 15 | 11 | 0 | 15 | 11 |
| DETDA[3] | 35 | 35 | 31.9 | 35 | 40 | 31.9 |
| Zinc Laurate[4] | 2.2 | 2.5 | 0 | 2.3 | 2.2 | 0 |
| AIP-F[5] | 0 | 0 | 0 | 0 | 45 | 0 |
| AIP-G[6] | 55 | 0 | 49.2 | 64 | 0 | 0 |
| AIP-H[7] | 0 | 47 | 0 | 0 | 0 | 0 |
| AIP-D[8] | 0 | 3 | 7 | 0.7 | 3 | 7.0 |
| Q2-7119[9] | 0 | 0 | 0.9 | 0 | 0 | 0.8 |
| Amine Catalyst[10] | 0 | 0 | 0 | 0 | 0 | 0.4 |
| Test | | | | | | |
| Green Strength[11] | Excell. | Fair | Good | Excell. | V. Good | V. Poor |
| Flexural Modulus[12] psi | 73,000 | 86,000 | 82,500 | 64,500 | 82,000 | 71,000 |

TABLE II-continued

| | Parts By Weight | | | | | |
|---|---|---|---|---|---|---|
| | Sample Number | | | | | Comp. Sample |
| Ingredient | 7 | 8 | 9 | 10 | 11 | B |
| Tensile Strength[12] psi | 5,650 | 4,850 | 4,850 | 4,760 | 5,300 | 4,015 |
| Elongation[12] % | 240 | 125 | 90 | 238 | 228 | 68 |
| Die "C" tear[13] pli | 789 | 797 | 698 | 812 | N.D. | 424 |
| 325° C. heat sag[14] | 0.99 | 1.17 | 0.86 | 1.85 | 2.0 | 1.22 |
| 275° C. heat sag[14] | 0.23 | 0.23 | 0 | 0.25 | 0.25 | 0.22 |
| −30° C. Gardner Impact Strength[15] in-lb | 160 | N.D. | 130 | N.D. | 140 | N.D. |
| Specific Gravity | 1.12 | 1.08 | 1.09 | 1.10 | 1.10 | 1.09 |

[1]5000 MW ethylene-oxide capped glycerine-initiated poly(propylene oxide) triol
[2]Jeffamine D-2000, sold by Texaco Chemical Company
[3]Diethyltoluenediamine
[4]Added as an internal mold release agent.
[5]An aminoethylpiperazine initiated, ethylene oxide capped poly(propylene oxide) of 6000 molecular weight.
[6]An aminoethylpiperazine initiated, ethylene oxide capped poly(propylene oxide) of 5000 molecular weight.
[7]An ethylene oxide capped poly(propylene oxide) of 5000 molecular weight co-initiated with 80 weight % amino ethylpiperazine and 20 weight % piperazine.
[8]AIP-D = an adduct of aminoethyl piperazine and 3 moles of propylene oxide.
[9]A silicone internal mold release agent available from Dow Corning Corporation.
[10]Dabco ® 33LV catalyst.
[11]Evaluated by bending over a corner of the demolded polymer. Excellent = no visual deformities on repeated bends. Good = slight crazing or cracking on repeated bends. Fair = slight crazing or cracking on first bends. Poor = substantial cracking on first bend. V. Poor = molding cracks upon removal from mold.
[12]ASTM D-790
[13]ASTM D-624-70
[14]Conducted for 30 minutes with 6" overhang
[15]ASTM D-256

Sample No. 9 and Comparative Sample B are direct comparisons. Comparative Sample No. B breaks up upon removal from its mold and cannot be tested for impact strength. By comparison, Sample No. 9 has good green strength and significantly, is improved in each property measured. Samples 7, 8, 10 and 11 also show improved green strength, compared to Comparative Sample No. B, where a variety of amine initiated polyols are employed.

EXAMPLE 3

Following the general procedure described in Example 1 an elastomer is prepared from a formulation containing on the "B" side 51.7 parts DETDA, 32.8 parts of Polyol A 15.5 parts of AIP-D and about 0.2% of an amine catalyst DBN sold by Abbott Laboratories and on the "A" side a prepolymer having an NCO content of 17.6% prepared from toluene diisocyanate and Polyol B. The B side temperature is 95° C., the A side temperature is 70° C., and the mold temperature is 170° F. The isocyanate index is 1.03. At demold, the green strength is good. Excellent green strength is obtained when a mixture of 0.1% of DBN catalyst and 0.1% of a delayed action catalyst SA-1, sold by Abbott Laboratories is used instead of the DBN catalyst, and the mold temperature is 205° C.

The properties of this molding are:

| | |
|---|---|
| Green Strength | Excellent |
| Flexural Modulus | 45,000 psi |
| Tensile Strength | 3,200 psi |
| Elongation | 300% |
| Die "C" tear | 497 p.l.i. |
| 325° F. Heat Sag | 3.2 in. |
| −30° C. Gardner Impact | 20 in-lb |
| Specific Gravity | 1.10 |

EXAMPLE 4

A "B" side formulation containing 45 parts Polyol F, 15 parts of the amine terminated polyol used in the foregoing examples, 37 parts DETDA, 3 parts AIP-D and 38 parts of flaked glass is reacted at a 103 isocyanate index with an isocyanate terminated prepolymer as employed in Example 1. A molding is prepared as indicated in Example 1 and has the following properties.

| | 4 |
|---|---|
| Green Strength | Excellent |
| Flexural Modulus | 184,000 |
| Tensile Strength | 4,300 |
| Elongation | 15% |
| D.C. "C" temp. | N.D. |
| 325° F. Heat Sag | 0.24 |
| −30° C. Gardner Impact Strength | 12 |
| Specific Gravity | 1.14 |

All tests are performed as indicated in Table I.

What is claimed is:

1. A polyurea or polyurea-polyurethane elastomer which is the reaction product of reaction mixture comprising (a) an organic polyisocyanate, (b) a low equivalent weight aromatic amine chain extender in an amount from about 15 to 60 parts by weight based on the weight of isocyanate reactive components present in said reaction mixture, (c) an amount of an amine-initiated polyol sufficient to provide the elastomer with a measurably decreased brittleness at demold as compared to a similar elastomer prepared in the absence of said amine initiated polyol.

2. The elastomer of claim 1 wherein the amine-initiated polyol is initiated with ammonia, methylamine, ethylene diamine, piperazine or aminoethylpiperazine.

3. The elastomer of claim 2 wherein the amine-initiated polyol has a molecular weight of about 100 to 1000.

4. The elastomer of claim 2 wherein the amine-initiated polyol has a molecular weight of about 1000 to 8,000.

5. The elastomer of claim 3 or 4 wherein the amine-initiated polyol is an aminoethylpiperazine initiated polyol.

6. The elastomer of claim 5 wherein the amine initiated polyol comprises a mixture of an aminoethyl piperazine initiated polyol having a molecular weight of about 1000–8000 and aminoethylpiperazine initiated polyol having a molecular weight of about 150 to 1000.

7. The elastomer of claim 1 wherein the aromatic amine chain extender has a functionality of about 2 to 4 and is substituted at all carbon atoms ortho to each amino group.

8. The elastomer of claim 7 wherein the aromatic amine chain extender is present in an amount from about 25 to 35% by weight based on the weight of the isocyanate reactive components present in the reaction mixture.

9. The elastomer of claim 8 wherein the amine initiated polyol has a molecular weight from about 100–1000 and comprises about 5–30 percent by weight of isocyanate reactive components present in the reaction mixture.

10. The elastomer of claim 8 wherein the amine initiated polyol has a molecular weight from about 1000–8000 and comprises from about 20–65 percent by weight of isocyanate reactive component present in the reaction mixture.

11. The elastomer of claim 8 wherein the amine initiated polyol comprises a mixture of an aminoethyl piperazine initiated polyol having a molecular weight of about 1000–8000 and aminoethylpiperazine initiated polyol having a molecular weight of about 150 to 1000.

12. The elastomer of claim 7 wherein the amine chain extender is present in an amount from about 35 to 55 percent by weight based on the weight of all isocyanate reactive components.

13. The elastomer of claim 12 wherein the amine initiated polyol has a molecular weight from about 100–1000 and comprises from about 5–30 percent by weight of isocyanate reactive components present in the reaction mixture.

14. The elastomer of claim 12 wherein the amine initiated polyol has a molecular weight from about 1000–8000 and comprises from about 20–65 percent by weight of isocyanate reactive component present in the reaction mixture.

15. The elastomer of claim 12 wherein the amine initiated polyol comprises a mixture of an aminoethyl piperazine initiated polyol having a molecular weight of about 1000–8000 and aminoethylpiperazine initiated polyol having a molecular weight of about 150 to 1000.

16. The elastomer of claim 8 or 12 wherein the amine chain extender is diethyltoluene diamine.

17. The elastomer of claim 1, 8 or 12 further comprising a relatively high equivalent weight polyahl is selected from the group consisting of polyether polyol, polyester polyols, amine terminated polyethers, and mixtures thereof.

18. The elastomer of claim 7 wherein the relatively high equivalent weight polyahl has a molecular weight from about 200 to 8000.

19. An active hydrogen-containing composition comprising from about 15–60 percent by weight of an aromatic polyamine chain extender and from about 3–65% by weight of an amine initiated polyol, based on the weight of isocyanate-reaction materials contained in the composition.

20. The composition of claim 19 further comprising a relatively high equivalent weight polyol or amine-terminated polyether.

21. The composition of claim 19 wherein the amine-initiated polyol is initiated with ammonia, methylamine, ethylene diamine, piperazine or aminoethyl piperizine.

* * * * *